(12) United States Patent
Izatt et al.

(10) Patent No.: US 7,472,414 B2
(45) Date of Patent: Dec. 30, 2008

(54) METHOD OF PROCESSING DATA TRAFFIC AT A FIREWALL

(75) Inventors: David Izatt, Huntsville, AL (US); Billy Ray Wilson, Huntsville, AL (US); Jackie Smith Cashion, Huntsville, AL (US); J. Chandler Hall, Huntsville, AL (US); Donald J. Davidson, Huntsville, AL (US); Russ Langston, Huntsville, AL (US)

(73) Assignee: Arxceo Corporation, Huntsville, AL (US)

( * ) Notice: Subject to any disclaimer, the term of this patent is extended or adjusted under 35 U.S.C. 154(b) by 681 days.

(21) Appl. No.: 11/205,351

(22) Filed: Aug. 17, 2005

(65) Prior Publication Data

US 2006/0005238 A1 Jan. 5, 2006

Related U.S. Application Data

(63) Continuation of application No. 11/065,688, filed on Feb. 24, 2005, which is a continuation-in-part of application No. 10/056,629, filed on Jan. 24, 2002, now Pat. No. 7,100,201.

(51) Int. Cl.
*G06F 21/00* (2006.01)
*G06F 15/16* (2006.01)
*G06F 11/30* (2006.01)

(52) U.S. Cl. ......................................... 726/11; 709/237
(58) Field of Classification Search ........................ None
See application file for complete search history.

(56) References Cited

U.S. PATENT DOCUMENTS

| | | | |
|---|---|---|---|
| 6,823,387 B1 * | 11/2004 | Srinivas | 709/227 |
| 6,856,991 B1 * | 2/2005 | Srivastava | 707/10 |
| 7,088,718 B1 * | 8/2006 | Srivastava | 370/392 |
| 7,114,096 B2 * | 9/2006 | Freimuth et al. | 714/13 |
| 7,213,063 B2 * | 5/2007 | Bressoud et al. | 709/223 |
| 7,266,754 B2 * | 9/2007 | Shah et al. | 714/776 |
| 7,269,654 B2 * | 9/2007 | Srinivas | 709/227 |
| 7,356,587 B2 * | 4/2008 | Boulanger et al. | 709/224 |
| 2001/0056492 A1 * | 12/2001 | Bressoud et al. | 709/227 |
| 2005/0027872 A1 * | 2/2005 | Srinivas | 709/227 |
| 2005/0039104 A1 * | 2/2005 | Shah et al. | 714/776 |
| 2005/0240989 A1 * | 10/2005 | Kim et al. | 726/11 |
| 2006/0168649 A1 * | 7/2006 | Venkat et al. | 726/5 |
| 2006/0191003 A1 * | 8/2006 | Bahk et al. | 726/14 |
| 2006/0230129 A1 * | 10/2006 | Swami et al. | 709/223 |
| 2006/0280121 A1 * | 12/2006 | Matoba | 370/235 |
| 2007/0211723 A1 * | 9/2007 | Patel et al. | 370/392 |
| 2008/0148406 A1 * | 6/2008 | Boulanger et al. | 726/23 |

OTHER PUBLICATIONS

"Catalyst 6500 Series Switch and Cisco 7600 Series Router Firewall Services Module Configuration Guide", 2004, Release 2.2, Chapter 1, p. 1-12.*

* cited by examiner

*Primary Examiner*—Christopher A Revak
(74) *Attorney, Agent, or Firm*—Kilpatrick Stockton LLP

(57) ABSTRACT

A method of processing data traffic at a firewall has been developed. The method prevents unauthorized access to a computer system by first receiving a SYN request for access to a destination in the system at a firewall. Upon receipt of a SYN request, the firewall sends a reply with an SYN/ACK message with changed packet information within the SYN/ACK message. The firewall receives an ACK message in reply to the SYN/ACK message. After the ACK message is authenticated by the firewall, the SYN request is recreated and forwarded to the destination in the system.

8 Claims, 9 Drawing Sheets

METHOD OF PROCESSING DATA TRAFFIC AT A FIREWALL

CROSS-REFERENCE TO RELATED APPLICATIONS

This application is a continuation of U.S. patent application Ser. No. 11/065,688 entitled "An Intelligent Firewall" that was filed on Feb. 24, 2005 which is a continuation-in-part of U.S. patent application Ser. No. 10/056,629 entitled "An Undetectable Firewall" that was filed Jan. 24, 2002, which is now U.S. Pat. No. 7,100,201.

BACKGROUND OF INVENTION

1. Field of the Invention

The invention relates generally to computer security. More particularly, this invention relates to a method of processing data traffic at a firewall.

2. Background Art

As society's dependence on computers increases, the importance of security for computers and their networks also increases. Threats such as hackers can shut down or damage large computer networks and cost significant amounts of money, resources, and time. Security measures to prevent such incidents are constantly evolving along with the nature and sophistication of the threat.

One technique to protect a computer network from external threats is by using a "firewall". A firewall is a combination of hardware and software that is placed between a network and its exterior. FIG. 1 shows a schematic of a prior art network 10 with a firewall. The network 10 includes a series of users 12a-12d that are linked and controlled through a server 14. The device could also be a router or a switch for the network. A firewall 16 is installed between the server 14 and the network exterior 20. The server 14, the firewall 16, and the exterior 20 are interconnected through a single line 18. The single line 18 prevents outsiders from accessing the network except through the firewall 16. The firewall receives all data from the network exterior before it is sent to the network users. The data may be e-mail, encrypted data, internet queries, or any other type of network traffic. The firewall sorts and analyzes the data and determines whether it should have access to the network. If the data is authorized, the firewall forwards the data on to its destination. If the data is unauthorized, the firewall denies access to the network.

Data is normally transmitted in multiple bundles of information called "data packets" or "packets". A message, query, etc. from the outside network is broken down into these packets in order to provide more efficient transmission of the data. Once all packets of data arrive at the destination, the packets are re-assembled. However, the packets contain more information than just the transmitted data. FIG. 2 shows a diagram of a prior art data packet 30. The packet 30 includes three segments: a header 32; a body 34; and a trailer 36. The body 34 is the segment that contains the actual substance of the data.

The header 32 and the trailer 36 both contain various fields that are necessary for the administrative control of the packet 30. The header 32 segment includes: a flag 38a; an address field 40; and a control field 42. The trailer 36 segment includes: a sequence check field 44 and a flag 38b. The first flag 38a signifies the start of the packet 30. A second flag 38b signifies the end of the packet 30. The sequence check field 44 provides a check to ensure the data of the packet was properly received. The address field 40 includes the addresses of the source and the destination of the data. The control field 42 contains various information related to the administration of the packet 30 including a "time-to-live" field. The time-to-live field is an internal countdown mechanism that ensures that undeliverable or lost packets are deleted. The time-to-live field is given a certain value when the packet is first transmitted. As the packet passes through various servers, routers, switches, bridges, gateways, etc. that makes up a network, the time-to-live field is decremented once by each device it passes through. Once the time-to-live field reaches zero, the packet is deleted. This mechanism prevents a lost or undeliverable packet from circulating on the network in an endless loop.

FIG. 3 shows a flow chart 50 of a prior art network firewall protection scheme. First, a packet is received at the firewall 52 from the network exterior 20. The firewall then conducts a handshake protocol 54 after receipt of the packet. The operations of network components are governed by protocols. A protocol is simply an established set of rules or standards that allow computers to connect with one another and exchange information and data with as little error as possible. Protocols may vary widely based different types of computer operating systems and on the different types of communications that are being transmitted. A handshake protocol governs a series of signals acknowledging that the transfer of data can take place between devices ("the handshake"). During the handshake, various changes are made to the packet by the firewall. The address of the firewall is added to the address field to show that the packet has left the firewall. Also, the time-to-live field is decremented by the firewall.

After completing the handshake 54, the packet is analyzed by the firewall to determine whether or not the data is acceptable to forward on to its destination in the network 56. The firewall analyzes the data through a technique called "pattern matching" that is well known in the art. Additionally, other techniques such as "protocol analysis" could be used as well. If the packet is authorized, it is forwarded on to the network destination by the firewall 58. If the packet is unauthorized, it is denied access to the network 60 and a message such as "resource denied" or "resource restricted" is sent to the sender. The party who sent the data from the exterior network is able to monitor and detect the presence of the firewall after the handshake protocol 62 and after access has been denied 62 due to the changes in the packet at the handshake 62. Once a hacker is able to detect the presence of a firewall, attempts can be made penetrate it and gain access to the network. If a hacker gains knowledge of the presence of a firewall, probes can be made against it. Ultimately, the firewall may be breached or bypassed and unauthorized access to the network can be gained by the hacker.

In addition to the contents of the data packet described in FIG. 2, a data packet will also contain an "ethernet frame field". The ethernet frame field is used by an ethernet card which is a piece of hardware within the firewall that manages access to the network. FIG. 4 shows a schematic 70 of a prior art data packet with an ethernet frame field. The contents of the data packet are similar to what was previously described in FIG. 2. The data packet includes three segments: a header 72; a body 74; and a trailer 76. The header 72 segment includes: a flag 78a; an address field 80; and a control field 82. The trailer 76 segment includes: a sequence check field 84 and a flag 78b. Additionally, two segments of the ethernet frame field 86a and 86b are included immediately in front of the first flag 78a and immediately following the second flag 78b respectively.

The ethernet frame field 86a and 86b is simply a protocol for processing the packet. Like the data packet, its contents are changed when it leaves the firewall. Specifically, the firewall adds its specific media access controller ("MAC")

address to frame field 86*a* and 86*b*. The MAC address is a layer of the ISO/OSI (International Organization for Standardization/Open Systems Interconnection) reference model. The ISO/OSI model separates computer to computer communication into seven protocol layers. The ethernet card and the MAC are parts of one of the lower layers of this model and they manage access to the physical network.

One prior art solution is to make a firewall more difficult to detect (a "stealth firewall"). FIG. 5 shows a flow chart 90 of a prior art network stealth firewall protection scheme. As shown previously in FIG. 3, a packet is first received at the firewall 92 from the network exterior 20. However, a stealth firewall conducts a different type of handshake protocol 94. A stealth firewall does not decrement the time-to-live field of the packet. Consequently, anyone monitoring the status of the packets in the network exterior 20 will not be able to see the stealth firewall due to a change in the value of the time-to-live field. After the stealth handshake 94, the stealth firewall analyzes the packet 96 in a similar manner as previously described for reference number 56 in prior art FIG. 3. If the packet is authorized, it is forwarded on to the network destination by the firewall 98. If the packet is not authorized, it is denied access to the network 100. However, the firewall does not respond to the sender with any type of message indicating a denial of access. Instead, the stealth firewall simply drops the packet 102. The sender is prevented from detecting the stealth firewall by finding any indication of its presence in a decremented time-to-live field or a denial of access message.

However, a stealth firewall may still be detected by the changes it makes to the packet during its handshake protocol 94. Specifically, a stealth firewall leaves its own MAC address in the packet as it conducts the stealth handshake protocol 94. Once the presence of the stealth firewall is detected through the MAC address, a hacker can then begin to probe the firewall and attempt to find a way around it to gain access to the network. In order to prevent attacks by hackers on a firewall, it is necessary to make the firewall undetectable to parties outside the network.

SUMMARY OF INVENTION

In some aspects, the invention relates to a method of preventing unauthorized access to a system, comprising: receiving a SYN request for access to a destination in the system at a firewall; replying to the SYN request with an SYN/ACK message from the firewall, where the firewall has changed packet information within the SYN/ACK message; receiving an ACK message in reply to the SYN/ACK message at the firewall; authenticating the ACK message with the firewall; recreating the SYN request; and forwarding the recreated SYN request to the destination in the system.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 6:
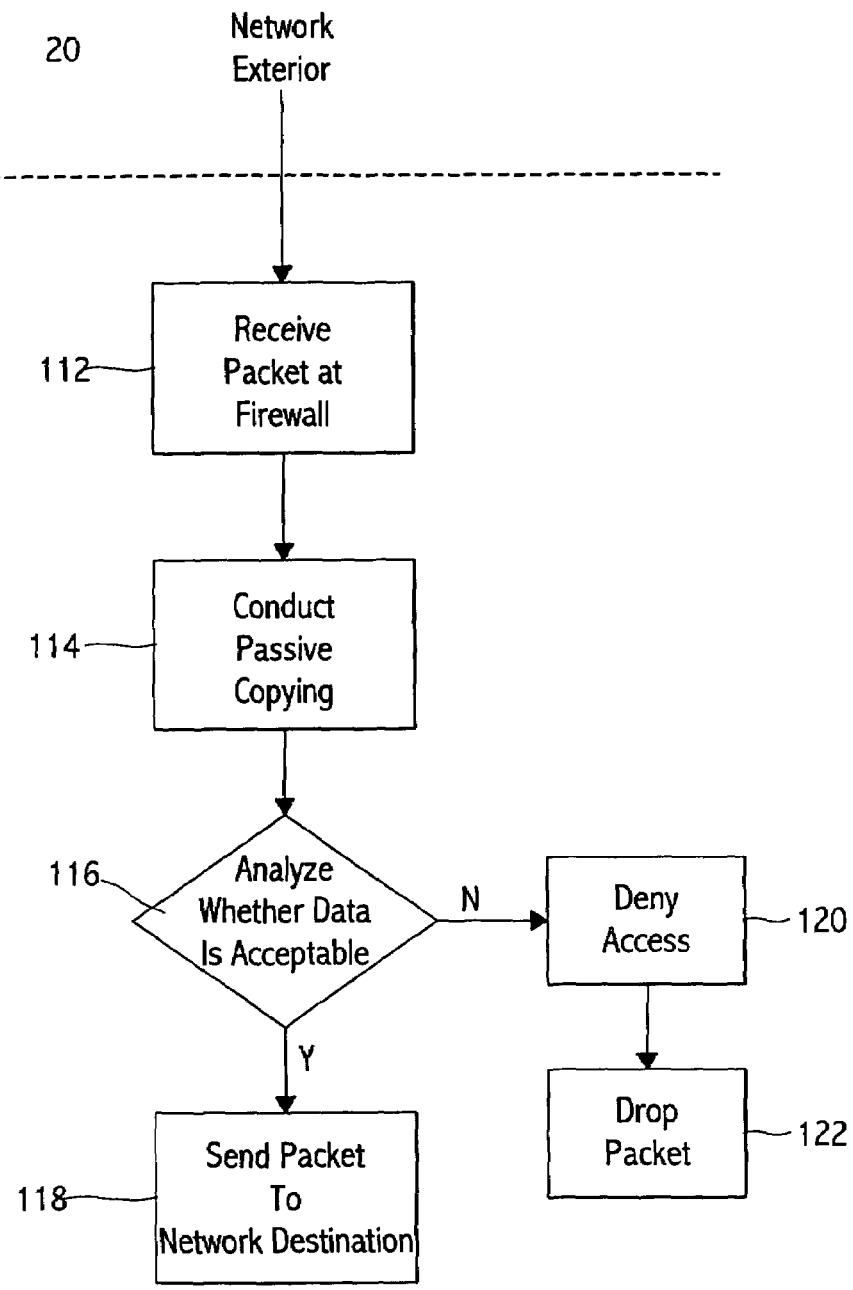
FIG. 6 shows a flow chart of one embodiment of network firewall protection in accordance with the present invention.

An undetectable firewall for network protection has been developed. FIG. 6 shows a flow chart 110 of one embodiment of network firewall protection in accordance with the present invention. First, a packet is received at the firewall 112 from the network exterior 20. The embodiment of the present invention conducts a "passive copying" 114 of the packet. After the packet is passively copied 114, the firewall analyzes the packet to determine whether or not it is acceptable to forward on to its destination in the network 116. The firewall analyzes the packet by the pattern matching technique, protocol analysis, or any other suitable technique that is known in the art. If the packet is acceptable, it is passed on through to the network 118. If the packet is not acceptable, access to the network is denied 120 and the packet is dropped 122 with no denial of access message being sent to the source of the packet. As a result, there is no detectable response to the sender of denied access from the firewall.

The passive copying 114 by the firewall of the packet is a low level operation that does not change the contents of the packet. No address exists for the firewall. Consequently, no address from the firewall is added to the packet, including the MAC address. Instead, the firewall allows the ethernet frame field along with the source address and other information of the packet to stay the same as when it was received by the firewall. The copied ethernet frame field is then used to transport the data packet. Additionally, the time-to-live field is not decremented by the firewall because the protocol of the operating system that requires decrementing is ignored. The entire contents of the packet, including the header with its address and control fields are exactly the same as when the packet was received by the firewall. Consequently, any party outside the network will not be able to detect the presence of the firewall by examining the contents of the packet or the ethernet frame field.

Figure 7:
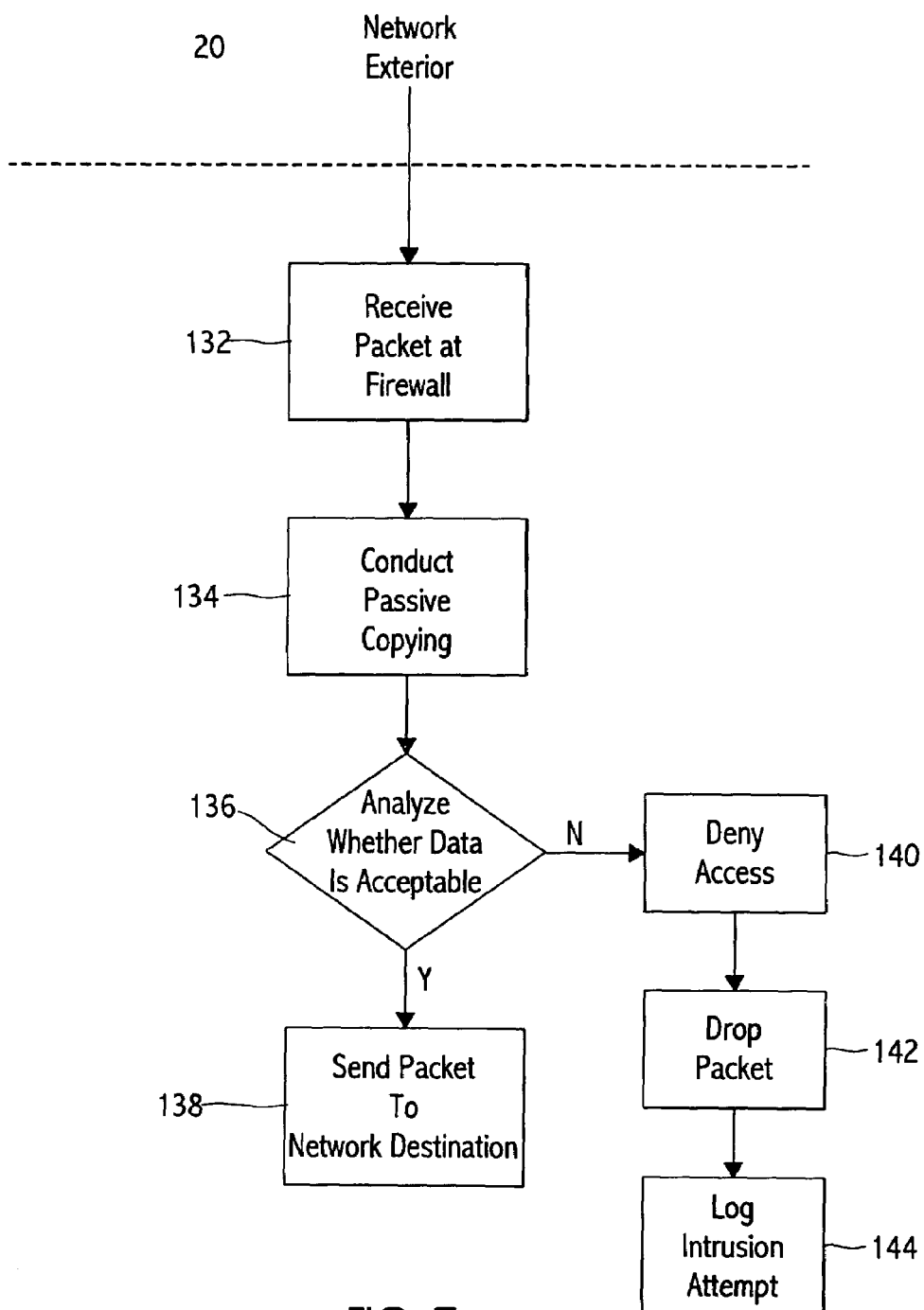
FIG. 7 shows a flow chart of an alternative embodiment of network firewall protection in accordance with the present invention.

FIG. 7 shows a flow chart 130 of an alternative embodiment of network firewall protection in accordance with the present invention. As in FIG. 6, a packet is received at the firewall 132 from the network exterior 20. The embodiment of the present invention conducts a "passive copying" 134 of the packet. This passive copying is the essentially the same as described previously for FIG. 6. After the packet is passively copied 134, the firewall analyzes the packet to determine whether or not it is acceptable to forward on to its destination in the network 136. The firewall analyzes the packet by the pattern matching technique, protocol analysis, or any other suitable technique that is known in the art. If the packet is acceptable, it is passed on through to the network 138. If the packet is not acceptable, access to the network is denied 140 and the packet is dropped 142 with no denial of access message being sent to the source of the packet. As a result, there is no detectable response to the sender of a denied from the firewall. Additionally, after the denial of access 140 and dropping the packet 142, the attempted intrusion into the network is logged 144. In alternative embodiments, the logging could be done before or simultaneous to dropping the packet 142.

The logging of the attempted access offers several possible actions available to network administrators. The logs of attempts of unauthorized access could be forwarded on to the authorities for further investigation. Also, if the packets are part of a "denial of service" attack, the data could be routed back to the attacker. Typically, a denial of service attack involves a multitude of requests to the network in such volume that it effectively shuts the network down.

In alternative embodiments, the firewall could be located in front of various segments of the network instead of only at the connection to the network exterior. This would provide protection not just from the network exterior, but also from other parts of the network. It also provides backup security should another firewall fail. The firewall could also be used to protect other network components such as routers and switches as well as the end users themselves.

Figure 1:
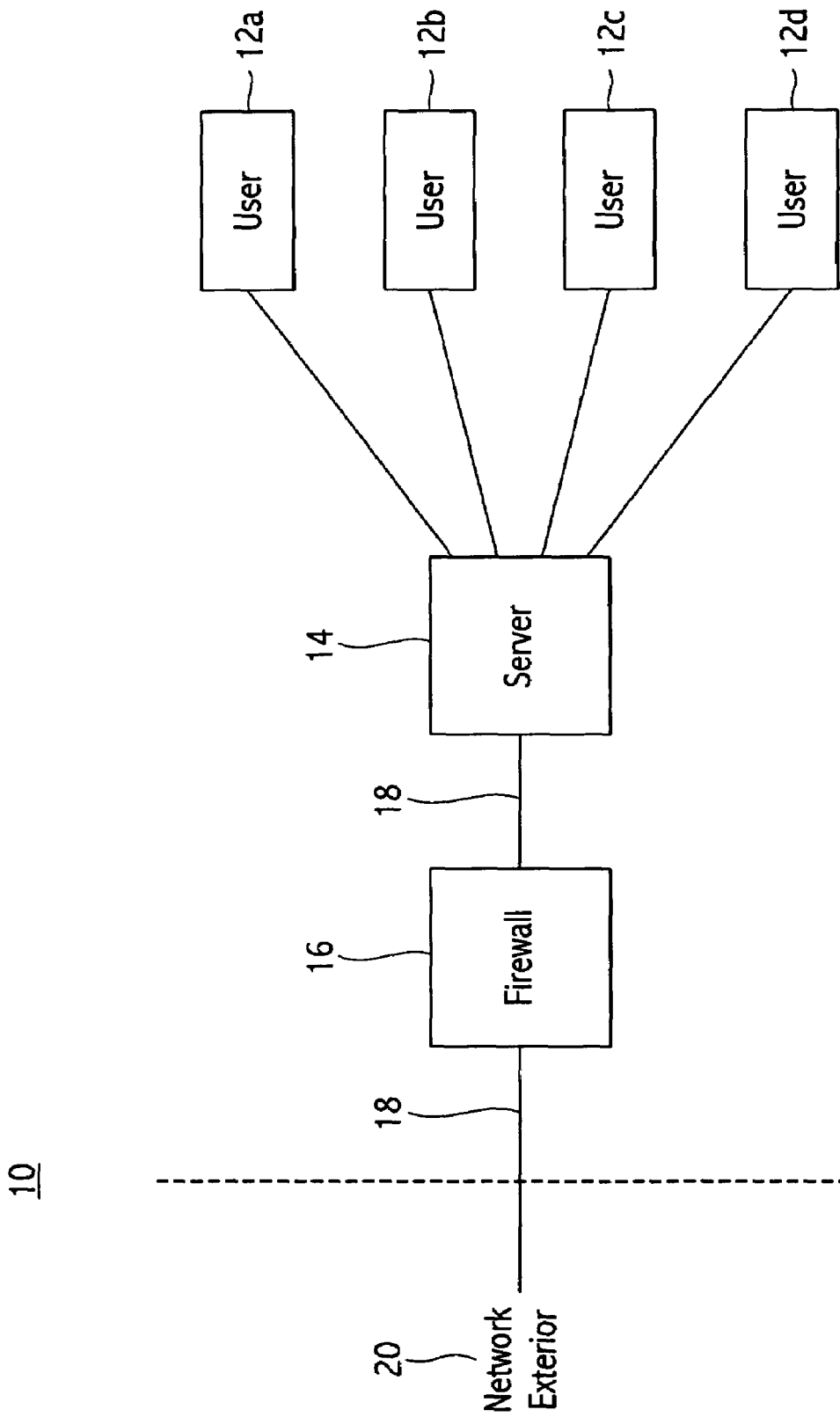
FIG. 1 shows a schematic of a prior art network with a firewall.
Figure 2:
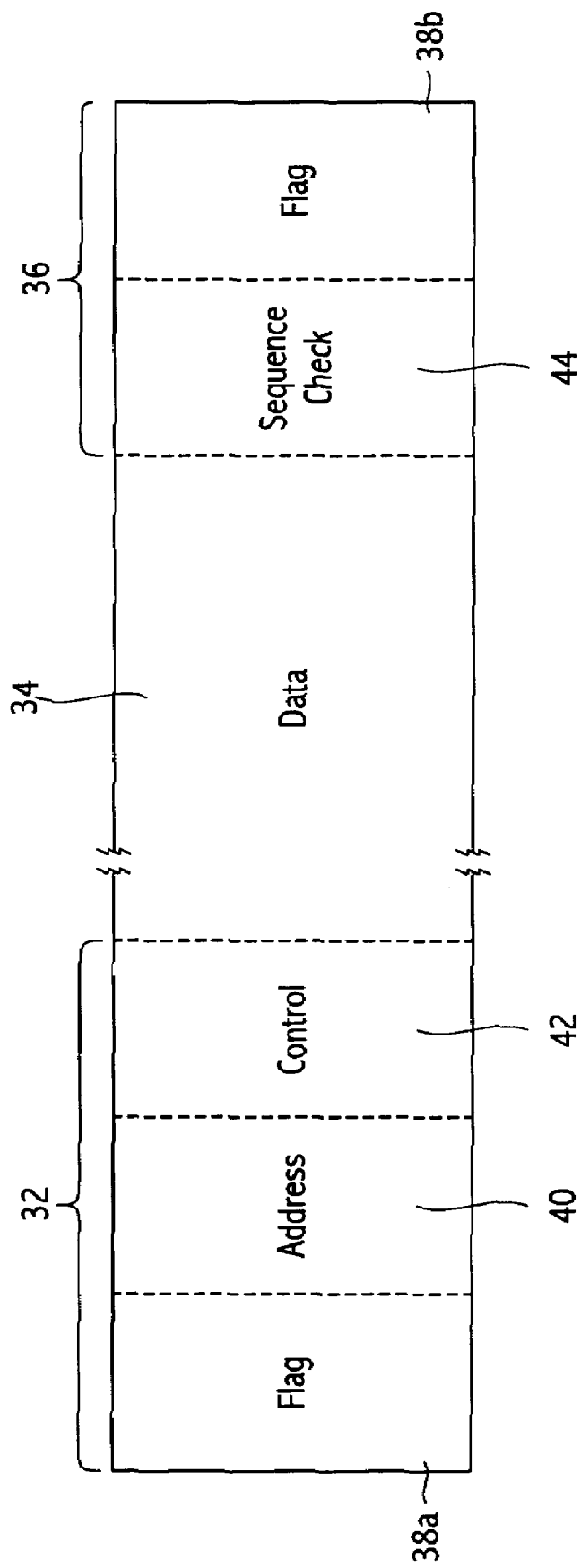
FIG. 2 shows a schematic of a prior art data packet.
Figure 3:
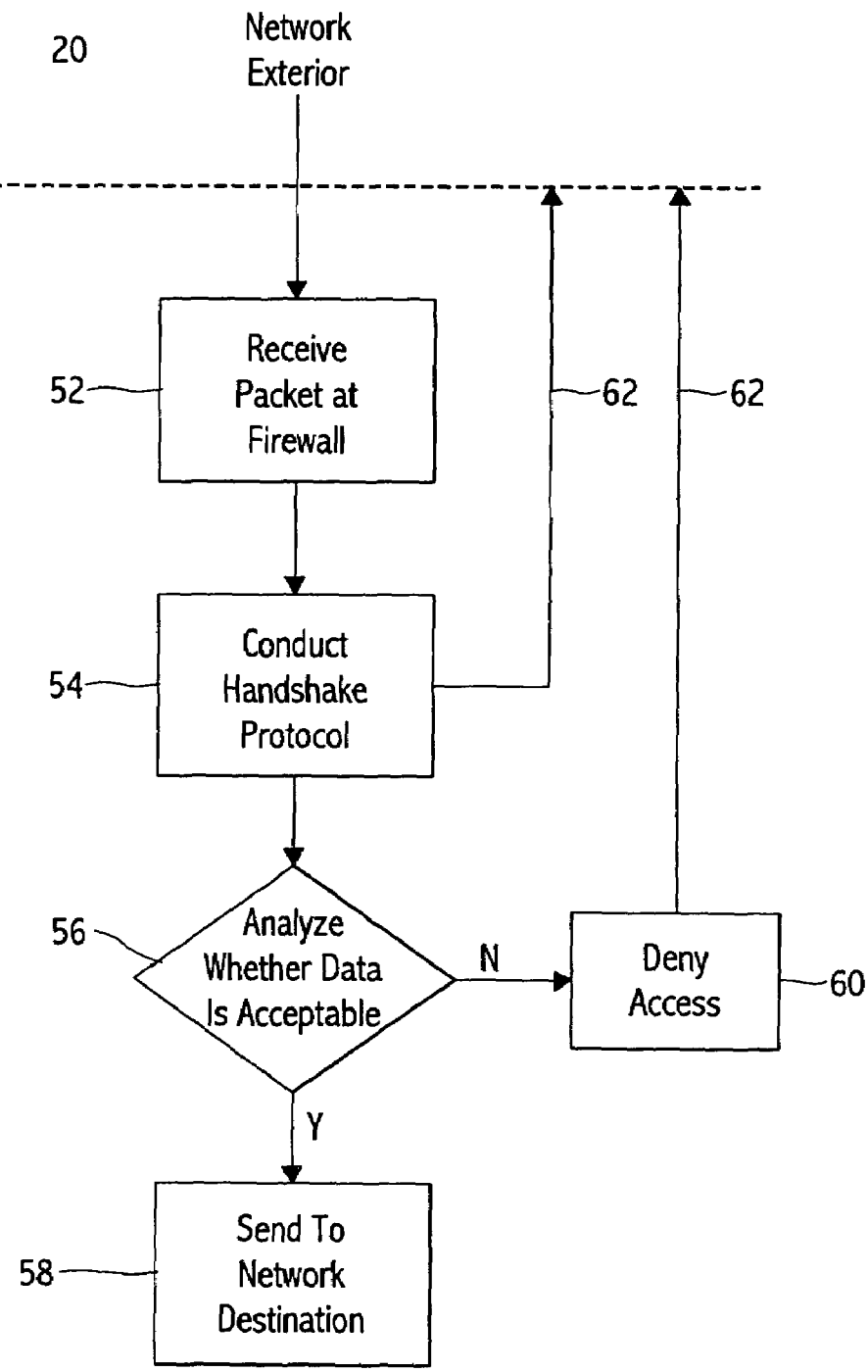
FIG. 3 shows a flow chart of a prior art network firewall protection scheme.
Figure 4:
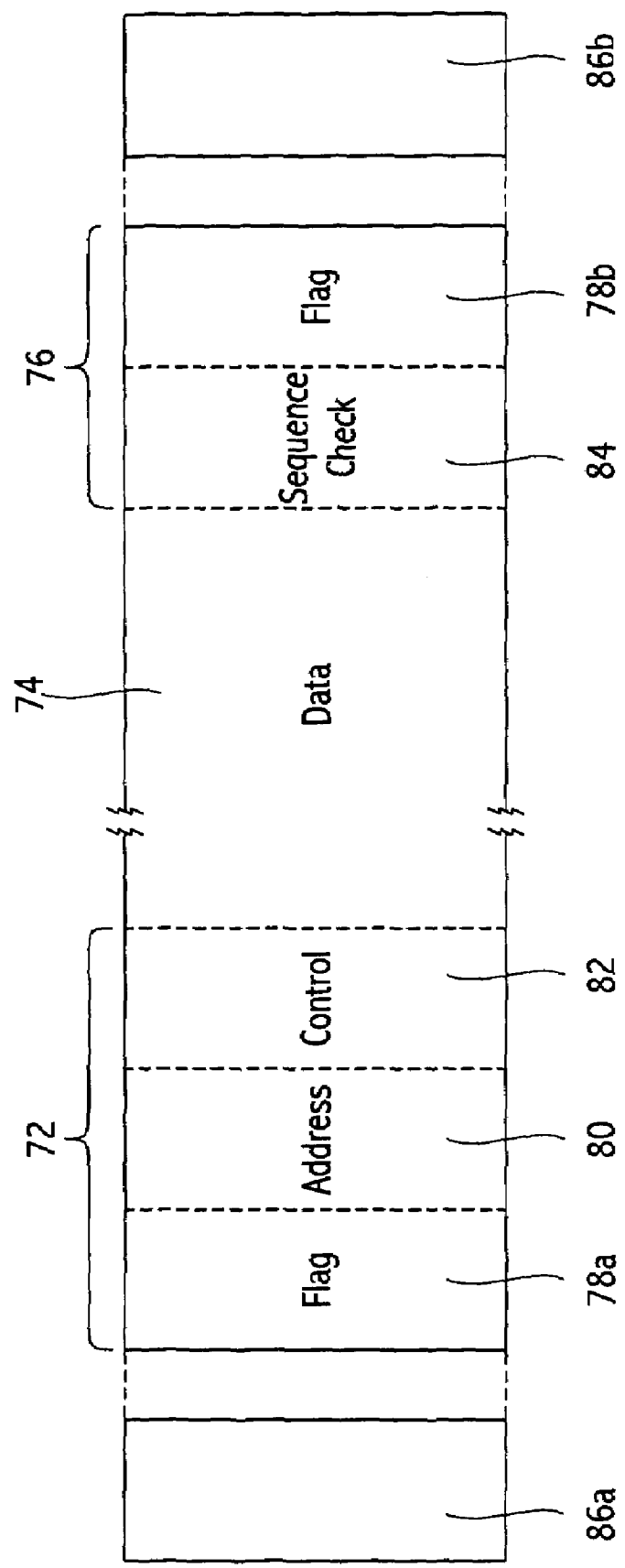
FIG. 4 shows a schematic of a prior art data packet with an Ethernet frame.
Figure 5:
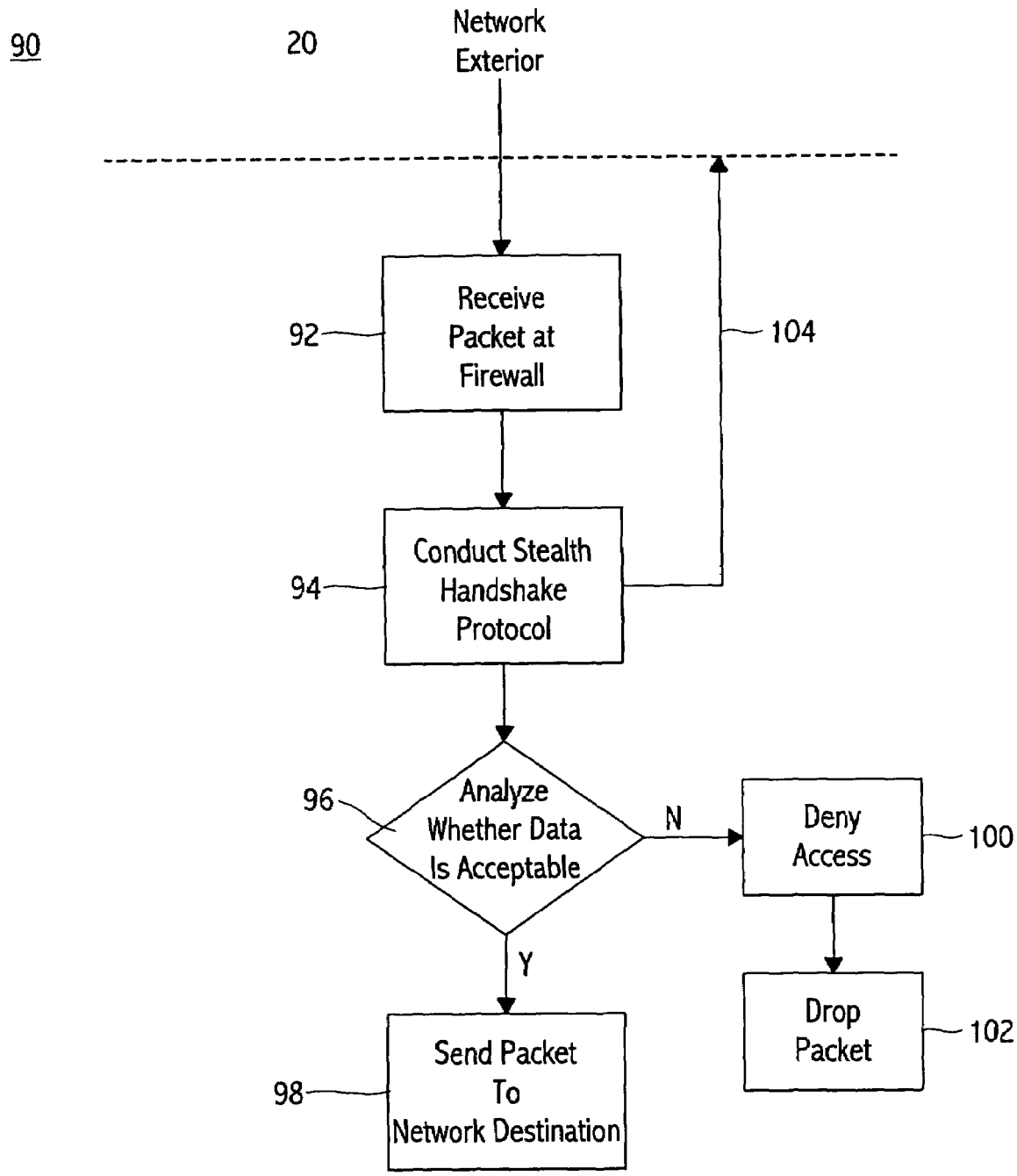
FIG. 5 shows a flow chart of a prior art network stealth firewall protection scheme.
Figure 8:
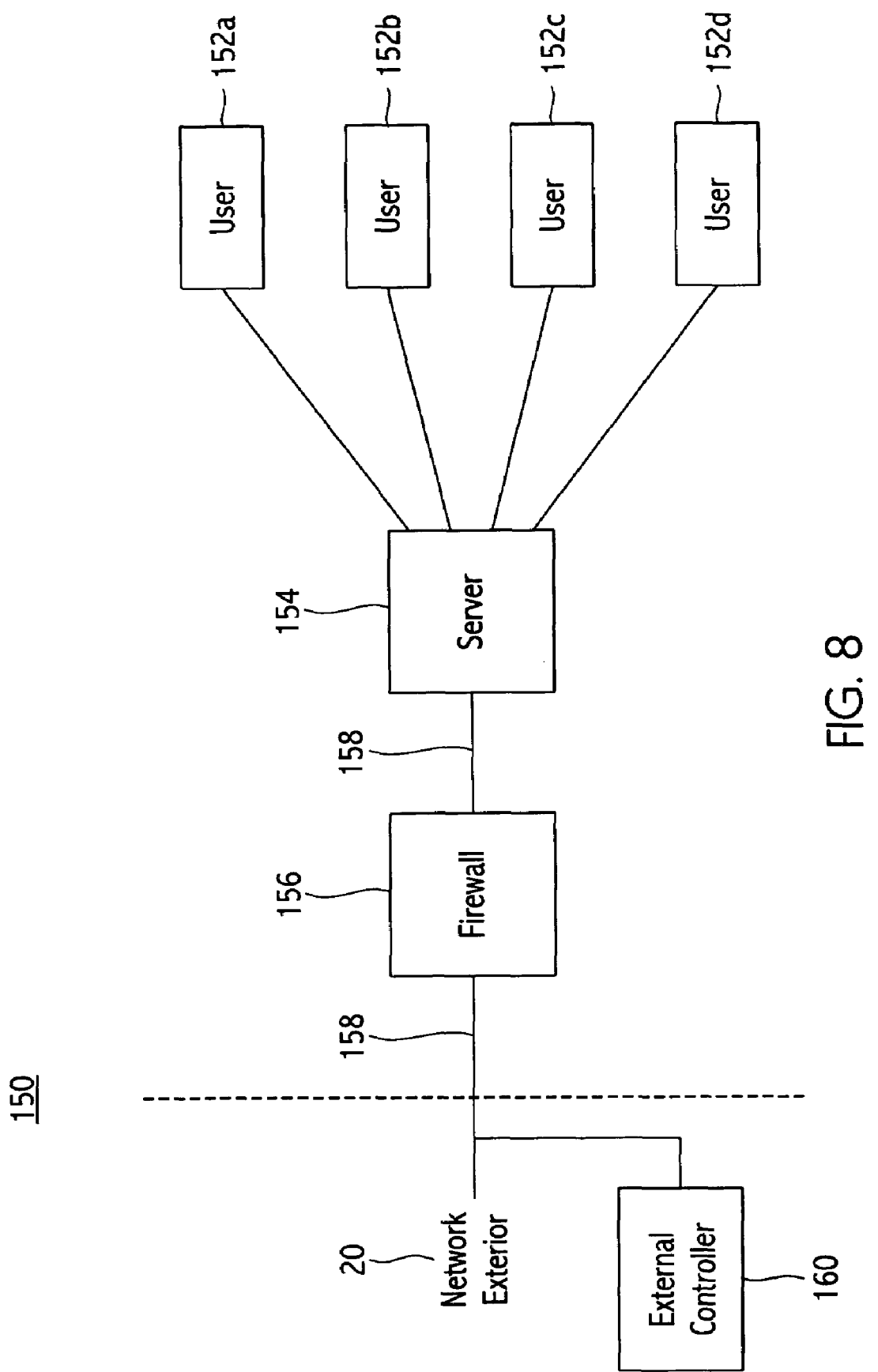
FIG. 8 shows a firewall network with an external controller in accordance with one embodiment of the present invention.

In addition to protecting against unauthorized intrusion, the present invention may also be used to remotely control and mange the firewall. FIG. 8 shows a firewall network with an external controller 150 in accordance with one embodiment of the present invention. The network 150 is similar to the prior art network previously described in FIG. 1. The network 150 includes a series of users 152a-152d that are linked and controlled through a server 154. The device could also be a router or a switch for the network. A firewall 156 is installed between the server 154 and the network exterior 20. The server 154, the firewall 156, and the exterior 20 are interconnected through a single line 158. The single line 158 prevents outsiders from accessing the network except through the firewall 156. In addition, an external controller 160 is shown in the network exterior 20. The controller 160 is used to remotely manage the firewall by a user such as a system administrator.

The controller 160 contacts the firewall 156 through the data line from the network exterior. The controller uses a technique known as "spoofing" to establish contact with the controller 160. Spoofing involves sending a transmission that appears to be coming from another source in order to hide the identity of the sender. Typically, this is done by embedding the address of the phony source in the data packet. In this embodiment of the invention, the controller 160 sends a command packet that is intended for the firewall 156 to some address destination behind the firewall. Inside the command packet is a password as well as command instructions to control the firewall 156. While a password is used in this embodiment, other embodiments could use other types of identification that are known in the art. Additionally, both the source address and the MAC address of the external controller 160 are spoofed to appear that they are coming from another source besides the external controller 160. Once the command packet is received at the firewall 156, the firewall conducts its passive copying of the packet and it searches for the password. If the password is found, the command packet is allowed to access the firewall 156. After access is allowed, the command data packet from the controller 160 is dropped without a trace.

Figure 9:
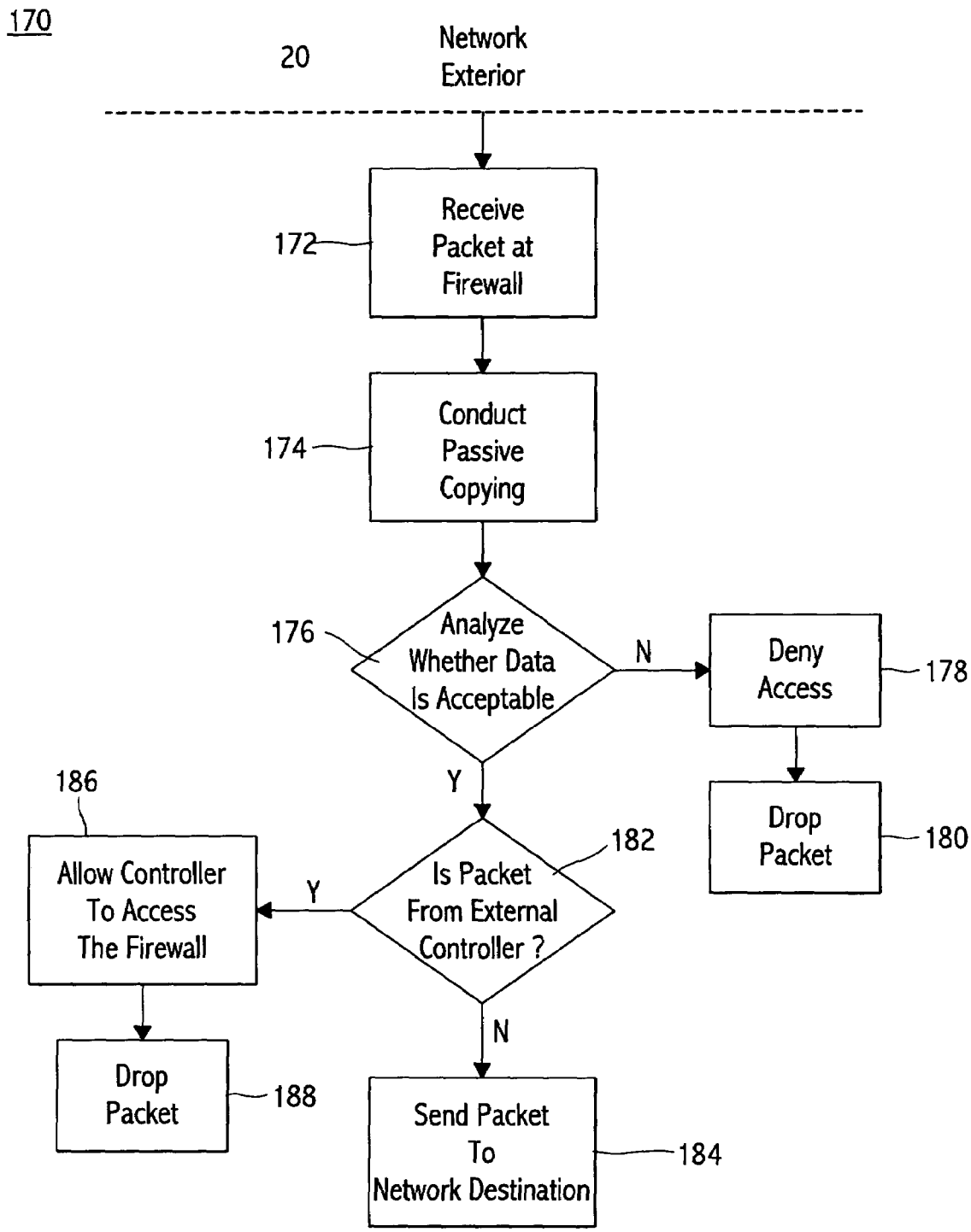
FIG. 9 shows a flow chart of one embodiment of external network control of a firewall in accordance with the present invention.

FIG. 9 shows a flow chart 170 of one embodiment of external network control of a firewall in accordance with the present invention. As in FIGS. 6 and 7, a packet is received at the firewall 172 from the network exterior 20. The embodiment of the present invention conducts passive copying 174 of the packet. This passive copying is the essentially the same as described previously for FIGS. 6 and 7. After the packet is passively copied 174, the firewall analyzes the packet to determine whether or not it is acceptable to forward on to its destination in the network 176. The firewall analyzes the packet by the pattern matching technique, protocol analysis, or any other suitable technique that is known in the art. If the packet is not acceptable, access to the network is denied 178 and the packet is dropped 180 with no denial of access message being sent to the source of the packet. As a result, there is no detectable response to the sender of denied access from the firewall. In other embodiments, after the denial of access 178 and dropping the packet 180, the attempted intrusion into the network could be logged as previously described in FIG. 7. In alternative embodiments, the logging could be done before or simultaneous to dropping the packet 180.

If the packet is authorized to access the network, it is examined for a password that indicates it is from the external controller 182. If no password is found, the packet is sent on to its network destination 184. If the password is found, the packet is allowed to access the firewall 186 and its command instructions are implemented. Finally, the packet is dropped by the firewall 188. In alternative embodiments, the packet could be examined for the password of the external controller 182 either before or simultaneously with the analysis of the data for proper authorization 176 to access the network.

This technique of managing a firewall provides security for several reasons. First, the firewall leaves no trace of its presence in the command packet by passively copying its contents. Also, the external controller leaves no trace of its origin by spoofing its address. Additionally, the command packet hides its true destination because it appears to be addressed to a destination behind the firewall. Finally, after the command packet accesses the firewall and its command instructions are received, it is dropped without a trace. Consequently, the firewall and its control mechanisms are hidden from any unauthorized parties who may be monitoring or intercepting network traffic.

In alternative embodiments, the present invention is an intelligent firewall that can add information to the packet before continuing operation. The addition of information or "tagging of data" can be used in analysis of the packet. If analysis shows an attempt at unauthorized access, the firewall may report the access attempt and take countermeasures. An advantage of this embodiment is that the firewall may inspect, deny/drop access, or allow access without using a network protocol stack. A protocol stack is a set of protocols that work together on different levels to enable communication on a network. Denial of access may include "active denial" by sending a denial of access message to the originator or "passive denial" by just dropping communication with the originator.

In this embodiment, the firewall does not have a TCP/IP (Transmission Control Protocol/Internet Protocol) address on any of its connected networks so it does not publish or respond to any communication attempts. Likewise, the firewall may or may not use a MAC address on any network and similarly does not publish or respond to any communication attempts. This is true for embodiments with the internal or external management interface. However in some cases, the firewall may have an additional network card added that has a usable TCP/IP address and MAC address for the firewall. This network card could be on an isolated or "out of band" network.

In other embodiments, the firewall could have an actual address (TCP/IP, MAC, ethernet, etc.) but does not use that address when receiving, analyzing, and handling data packets. In still other embodiments, the firewall may operate in an omni-direction manner. This means that the data packets could originate from within the network and have a final destination either within or external to the network. In operating in the omni-directional mode, the firewall may process and dispose of data packets moving in all directions not just being sent from an external source to a destination within the network.

The firewall modifies the packet by adding and/or changing information to the header, trailer, and/or trailer without violating any network communications standards or protocols. This information is defined as "state information". State information may be used for authentication as well as other functions. The added/changed state information may include: the originating IP address; the OS type and version; compression flags; window size flags; ports; state session information; etc. This "intelligent" information that is added to one or more segments of the packet allows for routing and security analysis by the system.

One example of such a security technique involves using the IP address of the originating source as an authentication tool in a three way handshake protocol. The three way handshake is a communication protocol known in the art that uses an initial SYN message from the originating source, a SYN/ACK reply from the firewall, and finally an ACK message that gains access to the network. The SYN/ACK message includes data that may be used to authenticate the originating source in the ACK reply message in order to gain access to the network. In the present security technique, the IP address of the origination source would be used to create a sequencing field used in the SYN/ACK message. The sequencing field may be created by using the IP address of the originating source, other data fields from the packet header, and a unique number such as a time stamp. Once the ACK message was received by the firewall, the incremented sequencing field could be compared to the original source address of the incoming ACK message to confirm the IP address of the before allowing access to the network.

For example, upon receipt of an access request as a SYN message from an originating source, the firewall will pretend to be the target destination. It will respond with a SYN/ACK message with the sequence field randomized, but containing the requesters IP address. Upon receipt of a valid ACK message from the requester, the firewall will re-create the original SYN message by stripping out the tagged information that authenticates the request and send it onto the target destination.

The firewall may provide an additional network security measure by randomizing and/or encrypting other fields in its packets. For example, communications ports used to request access to the network often use a standard port number or location. That location of the communication port may be encrypted or randomized with other methods to disguise its true location. In some embodiments that utilize TCP/IP protocols, two or more fields of the data packet may be randomized or encrypted. In non-TCP/IP protocols, one or more fields may be randomized or encrypted.

Network protocols typically require a minimum size for a data packet (e.g., an ethernet data packet is 64 bytes). If a data packet that is being transmitted is smaller than the minimum size, data from a prior transmission may be used to fill the packet. This is called "padded" data. In other embodiments, padded data may just be non required fields in certain protocols where old or uninitialized data is used. The firewall, while analyzing and handling the packet, may replace the padded data to prevent the information from being seen by unauthorized parties.

Additional security measures include using a special code or "secret handshake" used by the external controller and the firewall. The code is created by hashing a password into a sequence of closed port attempts to create a unique and highly secure password. Hashing is a technique used to convert an identifier or key, meaningful to a user, into a value for the location or the corresponding data in a structure, such as a data table.

The present embodiment may also include tools for system analysis. The pattern of network usage of each computer is stored by the system. The information for such usage may be obtained from the information tagged to the data packets. The network usage may be monitored in real time. If a significant variance in usage is detected, an individual machine may be shut down either automatically or by a system administrator. For example if the downloading of unauthorized MP3 music files from a point-to-point program is detected, the offending machine may be disabled.

Once an attempt at unauthorized access is detected, the firewall may take countermeasures against the originating computer. Such countermeasures may include: disguising the OS (operating system) used by the target in the network; adjusting window sizes to slow down the attacker; or using the originating computers address as a target from the "spoofed" or "zombie" computer instead of the user in the network. These countermeasures may be taken instead of or in addition to simply logging information about the access attempt by an unauthorized party.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method of preventing unauthorized access to a system, comprising:
   receiving a SYN request for access to a destination in the system at a firewall;
   replying to the SYN request with an SYN/ACK message from the firewall, where the firewall has changed packet information within the SYN/ACK message;
   receiving an ACK message in reply to the SYN/ACK message at the firewall;
   authenticating the ACK message with the firewall;
   recreating the SYN request; and
   forwarding the recreated SYN request to the destination in the system.

2. The method of claim 1, further comprising:
   discarding the ACK message at the firewall.

3. The method of claim 1, further comprising:
   replacing padded data from a data packet, where the padded data is required by a system protocol.

4. The method of claim 1, where authenticating the ACK message comprises adding state information within the SYN/ACK message.

5. The method of claim 1, where the changes to the packet information is stripped out of the recreated SYN request.

6. The method of claim 1, where the changes to the packet information comprise changes to at least two protocol fields of the state information.

7. The method of claim 1, where the changes to the packet information comprise changes to at least one protocol field of the state information for non-TCP protocol messages.

8. The method of claim 1, where the changes to the packet information comprise changes to at least two protocol fields of the state information.

* * * * *